US012671144B2

(12) United States Patent
Chen et al.

(10) Patent No.: US 12,671,144 B2
(45) Date of Patent: Jun. 30, 2026

(54) NON-WOVEN FABRIC AND PREPARATION METHOD THEREFOR, LITHIUM BATTERY DIAPHRAGM, AND LITHIUM BATTERY DIAPHRAGM BASE MEMBRANE

(71) Applicant: SHENZHEN SENIOR TECHNOLOGY MATERIAL CO., LTD., Shenzhen (CN)

(72) Inventors: Li Chen, Shenzhen (CN); Lujing Lin, Shenzhen (CN); Xuemei Yang, Shenzhen (CN); Xiufeng Chen, Shenzhen (CN)

(73) Assignee: SHENZHEN SENIOR TECHNOLOGY MATERIAL CO., LTD., Shenzhen (CN)

( * ) Notice: Subject to any disclaimer, the term of this patent is extended or adjusted under 35 U.S.C. 154(b) by 733 days.

(21) Appl. No.: 17/928,412

(22) PCT Filed: Jun. 12, 2020

(86) PCT No.: PCT/CN2020/095860
§ 371 (c)(1),
(2) Date: Nov. 29, 2022

(87) PCT Pub. No.: WO2021/248465
PCT Pub. Date: Dec. 16, 2021

(65) Prior Publication Data
US 2023/0216142 A1 Jul. 6, 2023

(51) Int. Cl.
H01M 50/44 (2021.01)
H01M 10/0525 (2010.01)
(Continued)

(52) U.S. Cl.
CPC ....... H01M 50/44 (2021.01); H01M 10/0525 (2013.01); H01M 50/403 (2021.01);
(Continued)

(58) Field of Classification Search
CPC ........ D04H 3/007; D04H 3/011; D04H 3/115; H01M 10/052; H01M 10/0525;
(Continued)

(56) References Cited

U.S. PATENT DOCUMENTS

2017/0346062 A1* 11/2017 Wong .................. H01M 50/417

FOREIGN PATENT DOCUMENTS

CN 1917255 A 2/2007
CN 103931021 A 7/2014
(Continued)

OTHER PUBLICATIONS

English Machine Translation: Teruhisa et al. (JP 11-354093).*
(Continued)

*Primary Examiner* — Holly Rickman
*Assistant Examiner* — Linda N Chau
(74) *Attorney, Agent, or Firm* — Meunier Carlin & Curfman LLC

(57) ABSTRACT

A non-woven fabric and a preparation method therefore, a lithium battery diaphragm and a lithium battery diaphragm base membrane, relating to the field of materials. Raw materials of the non-woven fabric include main fibers and bonding fibers, wherein the bonding fibers include first bonding fibers and second bonding fibers; the melting point or softening point of the first bonding fibers is 120-220° C., and the melting point or softening point of the second bonding fibers is 100-170° C., the melting point or softening point of the second bonding fibers is at least 15° C. lower than that of the first bonding fibers; and the melting point or softening point of the main fibers is at least 20° C. higher than that of the first bonding fibers.

7 Claims, 3 Drawing Sheets

(51) Int. Cl.

| | |
|---|---|
| *H01M 50/403* | (2021.01) |
| *H01M 50/417* | (2021.01) |
| *H01M 50/423* | (2021.01) |
| *H01M 50/491* | (2021.01) |

(52) U.S. Cl.
CPC ....... *H01M 50/417* (2021.01); *H01M 50/423* (2021.01); *H01M 50/491* (2021.01)

(58) Field of Classification Search
CPC ............ H01M 50/403; H01M 50/409; H01M 50/414; H01M 50/417; H01M 50/42; H01M 50/423; H01M 50/426; H01M 50/44; H01M 50/449; H01M 50/451; H01M 50/454; H01M 50/489; H01M 50/491; H01M 50/494; Y02E 60/10
See application file for complete search history.

(56) References Cited

FOREIGN PATENT DOCUMENTS

| | | | |
|---|---|---|---|
| CN | 104160527 A | 11/2014 |
| CN | 104995765 A | 10/2015 |
| CN | 105935556 A | 9/2016 |
| CN | 107248563 A | 10/2017 |
| CN | 107558291 A | 1/2018 |
| CN | 108598337 A | 9/2018 |
| CN | 110429227 A | 11/2019 |
| JP | H11354093 A | 12/1999 |
| JP | 2000106163 A | 4/2000 |
| JP | 2000215876 A | 8/2000 |
| JP | 2003268662 A | 9/2003 |
| JP | 2010238448 A | 10/2010 |
| JP | 2012138235 A | 7/2012 |
| JP | 2013170321 A | 9/2013 |
| JP | 2014037644 A | 2/2014 |
| JP | 2015192778 A | 11/2015 |
| JP | 2016110763 A | 6/2016 |
| JP | 2021017673 A | 2/2021 |
| WO | 2014123033 A1 | 8/2014 |
| WO | 2019017354 A1 | 1/2019 |
| WO | 2020059582 A1 | 3/2020 |

OTHER PUBLICATIONS

English Machine Translation: Tskuda et al. (JP 2012-138235).*
Griehl et al., Nylon 12—Preparation, Properties, and Applications, Ind. Eng. Chem., vol. 62, pp. 16-22. (Year: 1970).*
Communication Pursuant to Article 94(3) EPC for European Application No. 20940422.7, dated Oct. 10, 2023, 4 Pages.
European Search Report for European Application No. 20940422.7, dated Sep. 27, 2023, 4 Pages.
International Preliminary Report on Patentability for International Application No. PCT/CN2020/095860, dated Dec. 22, 2022, 9 Pages.
Notice of Reasons for Rejection for Japanese Application No. 2022-573619, dated Mar. 19, 2024, 6 Pages.
Notice of Reasons for Rejection for Japanese Application No. 2022-573619, dated Oct. 24, 2023, 7 Pages.
Notice of Submission of Opinions for Korean Application No. 10-2022-7039947, dated Mar. 4, 2025, 12 Pages.
Notification to Grant Patent Right for Invention for Chinese Application No. 202080001117.5, dated Sep. 20, 2022, 8 Pages.
Third Party Observation for Japanese Application No. 2022-573619, dated Aug. 29, 2023, 2 Pages.
English Translation of the International Search Report in Application No. PCT/CN2020/095860, mailed Mar. 10, 2021, 2 pages.

* cited by examiner

NON-WOVEN FABRIC AND PREPARATION METHOD THEREFOR, LITHIUM BATTERY DIAPHRAGM, AND LITHIUM BATTERY DIAPHRAGM BASE MEMBRANE

CROSS REFERENCES

This application is a U.S. national stage application of international application number PCT/CN2020/095860 filed on Jun. 12, 2020.

TECHNICAL FIELD

The present disclosure relates to the field of materials, and particularly to a non-woven fabric and a preparation method therefor, a lithium battery diaphragm (separator), and a lithium battery diaphragm (separator) base membrane.

BACKGROUND ART

Mainstream lithium-ion battery separators on the market are porous polyolefin membranes mainly based on polyethylene (PE) and polypropylene (PP), and separators of different specifications are usually adopted according to the applications, such as single-layer, double-layer, and three-layer wet or dry separators. Porous polyolefin separators are suitable for large-scale industrial use because of high cost performance thereof, but its disadvantage of poor thermal stability has become a bottleneck restricting further improvement of the energy density of batteries. Lithium battery separators of polyolefin undergo great thermal contraction at a high temperature >140° C., and under severe thermal contraction of the separator, the positive and negative electrodes of the battery may easily contact with each other and cause short circuit, resulting in the occurrence of spontaneous combustion and spontaneous detonation of the battery due to thermal runaway.

Because of excellent heat resistance, separators of non-woven fabrics have great application potential in high-energy lithium battery systems. Separators of non-woven fabrics have high porosity and high thermal stability, and can reach a heat-resistance temperature above 150° C., while the three-dimensional pore structure of the non-woven fabrics can ensure a relatively high electrolyte retention rate and effectively prevent the occurrence of short circuit problems caused by pierced separators.

Non-woven fabrics have natural large pore size and high porosity, but the thickness thereof needs to be increased in order to prevent dendritic growth penetrating the pore size. Thus, it is difficult to simultaneously meet requirements for lithium-ion battery separators in the two aspects of pore size and thickness. In the prior art, non-woven fabrics cannot be used directly as lithium-ion battery separators, and usually are suitable only for use as a base membrane for composite separators of lithium-ion batteries.

In order to ensure the high performance of a lithium-ion battery separator, excellent consistency of the overlay layer on the non-woven fabric is necessary, and it is accordingly required that the non-woven fabric has excellent homogeneity and the coating surface has excellent smoothness. Moreover, excellent adhesiveness of the coating surface of the non-woven fabric is also required, so as to ensure firm bonding between the overlay layer and the non-woven fabric and no occurrence of stratification or delamination between the coating and the non-woven fabric.

SUMMARY

An object of embodiments of the present disclosure is to provide a non-woven fabric and a preparation method therefor, a lithium battery separator, and a lithium battery separator base membrane, aiming at improving the bonding performance of the non-woven fabric with other materials such as a coating.

A first aspect of the present disclosure provides a non-woven fabric, of which the raw material comprises a main fiber and a binder fiber.

The binder fiber comprises a first binder fiber and a second binder fiber.

The first binder fiber has a melting point or softening point ranging from 120 to 220° C.; the second binder fiber has a melting point or softening point ranging from 100 to 170° C., and the melting point or softening point of the second binder fiber is lower than the melting point or softening point of the first binder fiber by 15° C. or more.

The melting point or softening point of the main fiber is higher than the melting point or softening point of the first binder fiber by 20° C. or more.

The second binder fiber has a relatively low melting point or softening point, which ranges from 105 to 170° C., and firstly melts during hot-calendering treatment, so as to form a discontinuous fine concave-convex structure on the surface of the non-woven fabric. The melting point or softening point of the main fiber is higher than that of the first binder fiber and that of the second binder fiber, and can have high dimensional stability during hot-pressing treatment, while the first binder fiber melts locally and the second binder fiber melts entirely, wherein the respective fibers are adhered to each other, and a three-dimensional network structure of the non-woven fabric is formed after being cooled. The melting point or softening point of the second binder fiber is lower than the melting point or softening point of the first binder fiber by 15° C. or more; and during the hot-pressing treatment, the second binder fiber melts at first, and then the first binder fiber melts, wherein the melting degrees at respective temperatures during the formation of the non-woven fabric are controlled so as to form a fine concave-convex structure on the surface. The concave-convex structure can enable a coating layer and the non-woven fabric to have an anchoring effect realizing a robust joint. An overlay slurry is embedded into the fine concave pores on the surface of the non-woven fabric and is immobile after the curing of the coating, hereby producing extremely strong bonding strength.

In some embodiments of the first aspect of the present disclosure, the melting point or softening point of the second binder fiber is lower than the melting point or softening point of the first binder fiber by 20-100° C.

In some embodiments of the first aspect of the present disclosure, both the first binder fiber and the second binder fiber have a fiber length ranging from 1 to 6 mm, and both the first binder fiber and the second binder fiber have a fiber diameter less than or equal to 10 μm.

The fiber length of the main fiber ranges from 1 to 6 mm; and the fiber diameter of the main fiber is less than or equal to 4 μm.

Optionally, both the first binder fiber and the second binder fiber have a fiber diameter ranging from 2.5 to 9 μm; and the fiber diameter of the main fiber ranges from 1 to 3.5 μm.

In some embodiments of the first aspect of the present disclosure, the main fiber accounts for 60-80% of the total mass of the main fiber and the binder fiber of the non-woven fabric.

Optionally, the main fiber accounts for 65-75% of the total mass of the main fiber and the binder fiber of the non-woven fabric.

In some embodiments of the first aspect of the present disclosure, the second binder fiber accounts for 10-40% of the total mass of the binder fiber.

Optionally, the second binder fiber accounts for 20-30% of the total mass of the binder fiber.

In some embodiments of the first aspect of the present disclosure, the non-woven fabric has a density of 0.50-0.9 g/cm³, the average pore size is not greater than 4.5 µm, and the ratio of the maximum pore size to the average pore size ranges from 1 to 10.

In some embodiments of the first aspect of the present disclosure, materials for the main fiber include at least one from polyester fiber, polyolefin fiber, polyamide fiber, polyimide fiber, polytetrafluoroethylene fiber, polyphenylene sulfide fiber, polyether ether ketone fiber, polyacrylonitrile fiber, polycarbonate fiber, and aramid fiber.

In some embodiments of the first aspect of the present disclosure, materials for the first binder fiber include at least one from undrawn polyester fiber, polyvinylidene fluoride fiber, polyamide fiber, copolyamide fiber, and polyolefin fiber.

Materials for the second binder fiber include at least one from polyolefin fiber, copolyester fiber, and copolyamide fiber.

A second aspect of the present disclosure provides a preparation method for a non-woven fabric, wherein the temperature for the hot-pressing treatment is higher than the melting point or softening point of the second binder fiber by 10° C. or more, and the temperature for the hot-pressing treatment is not higher than the melting point or softening point of the main fiber; optionally, the hot-pressing speed of the hot-pressing treatment is 1-100 m/min.

A third aspect of the present disclosure provides a lithium battery separator base membrane, with a lithium battery separator base membrane comprising a non-woven fabric provided in the foregoing first aspect.

A fourth aspect of the present disclosure provides a lithium battery separator, comprising a coating and a base membrane provided in the foregoing second aspect, wherein the coating is attached to the surface of the base membrane.

Thanks to the concave-convex structure on the surface thereof, the non-woven fabric provided in the present disclosure can improve the engagement of the non-woven fabric and increase the contact area of the overlay slurry with the non-woven fabric, such that an engaging force is produced by the surfaces of the two inlaid with each other, hereby achieving the effect of a robust joint.

The homogeneity and the excellent engagement of the non-woven fabric enable a firm joint between the coating layer and the non-woven fabric, and there is no stratification or delamination between the coating and the non-woven fabric.

BRIEF DESCRIPTION OF DRAWINGS

In order to more clearly describe the technical solutions of the embodiments of the present disclosure, the drawings required to be used in the embodiments will be simply presented below; and it shall be understood that the following drawings merely show certain embodiments of the present disclosure, and thus should not be deemed as limiting the scope thereof, and for a person ordinarily skilled in the art, further relevant drawings could be obtained according to these drawings without using any creative efforts.

4

Figure 2:
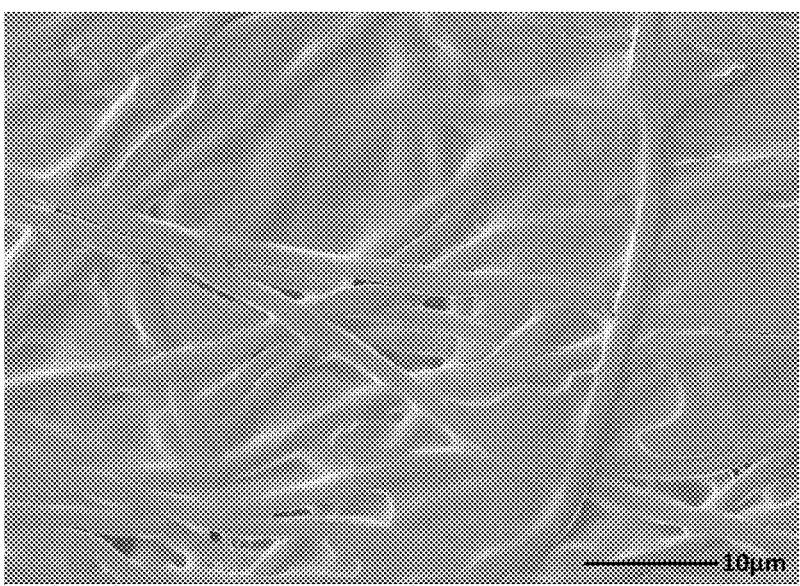

FIG. 2 shows an electron micrograph of the surface of a non-woven fabric according to Comparative Example 1.

Figure 3:
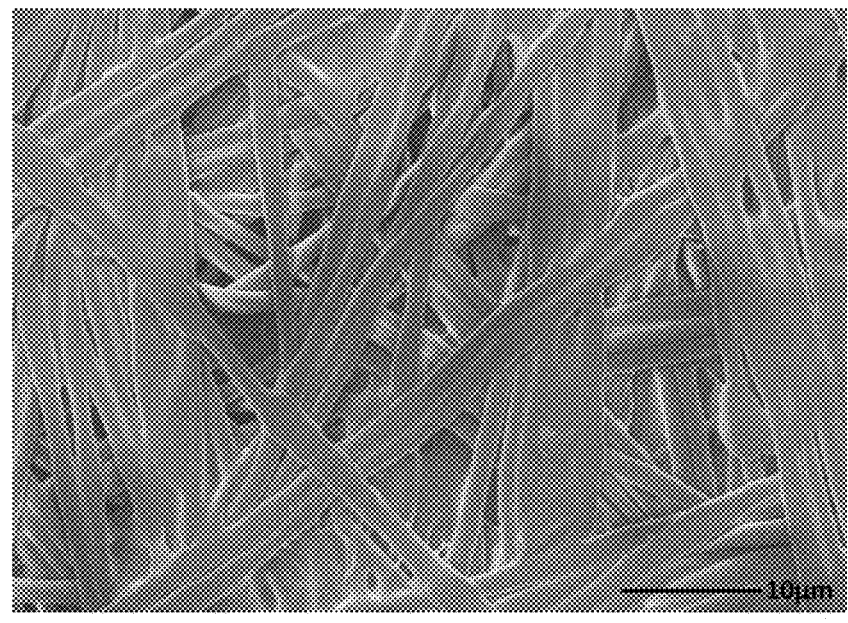

FIG. 3 shows an electron micrograph of the surface of a non-woven fabric according to Comparative Example 2.

Figure 4:
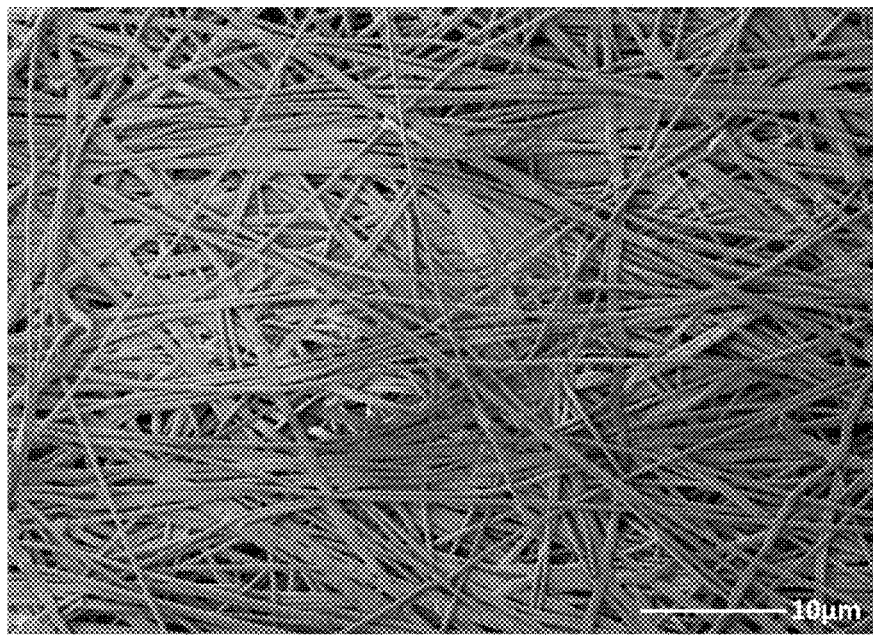

FIG. 4 shows an electron micrograph of the surface of a non-woven fabric according to Comparative Example 3.

Figure 5:
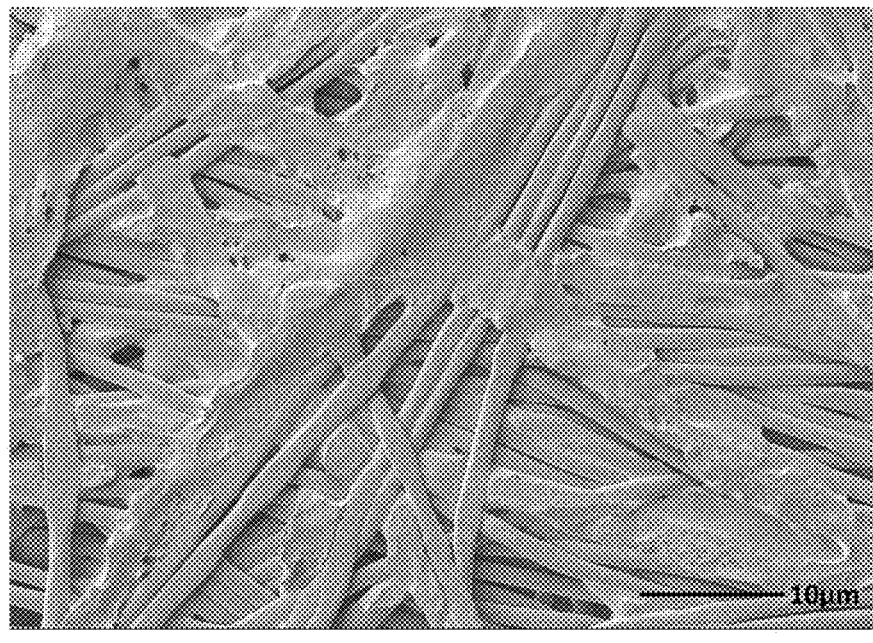

FIG. 5 shows an electron micrograph of the surface of a non-woven fabric according to Comparative Example 4.

Figure 6:
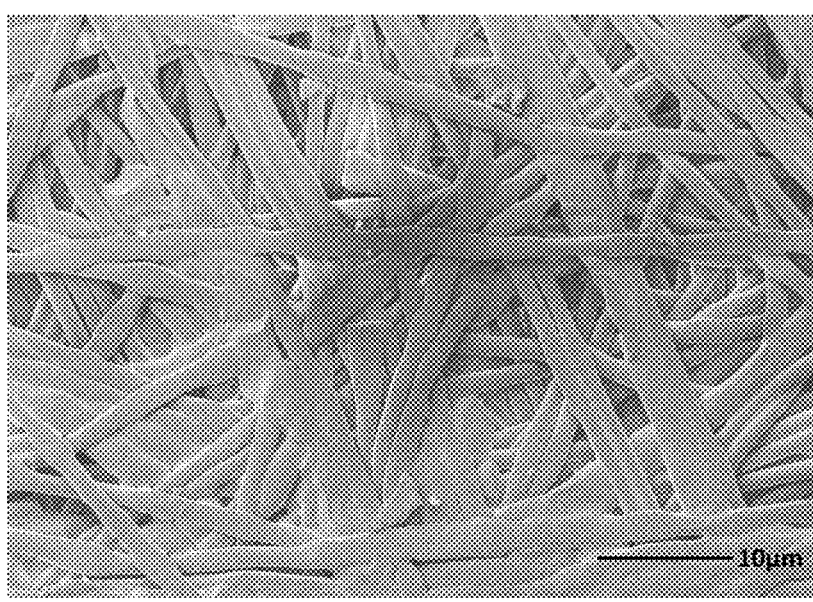

FIG. 6 shows an electron micrograph of the surface of a non-woven fabric sample according to Comparative Example 5.

DETAILED DESCRIPTION OF EMBODIMENTS

In order to make the objects, the technical solutions, and the advantages of the embodiments of the present disclosure clearer, the technical solutions in the embodiments of the present disclosure will be clearly and comprehensively described below. Examples, for which no concrete conditions are specified, are performed according to conventional conditions or conditions recommended by the manufactures. Reagents or instruments that are used, for which no manufacturers are specified, are conventional products available commercially.

As for a method for compounding an overlay layer on the support layer of a non-woven fabric, an overlay slurry is generally firstly prepared, the slurry is then coated onto the surface of the non-woven fabric by way of micro-concave roller coating, spray coating, dip coating or the like, and the coating is cured after drying. The production of a bonding force between the coating and the non-woven fabric is a result of interaction between different material interfaces after contact with each other, but influence factors are complex, and it may be influenced by the interfacial tension, the surface free energy, the functional group property, the interfacial reaction between the coating and the non-woven fabric or the like. Based on the adsorption theory and the diffusion theory, the bonding force between the coating and the non-woven fabric mainly comes from the molecular action force of the system, that is, the van der Waals attraction and the hydrogen bond force. Based on the chemical bond theory, the coating and a base membrane are bonded via a chemical bond, but the formation of a chemical bond is not common, certain conditions must be satisfied to form a chemical bond, and it is impossible to form a chemical bond at every contact point between an adhesive and a substrate. Based on the mechanical theory, a bonding force between the coating layer and the non-woven fabric is produced mainly because the overlay slurry permeates into the pores or the location of the concave-convex structure on the surface of the non-woven fabric and produces an engaging force due to inlaying at the interface after being cured, and the essence of such a connection force is frictional force.

If the coating layer of the non-woven fabric has poor engaging performance, the overlay slurry cannot well infiltrate the surface of the non-woven fabric, and air bubbles remaining in the pores causes that the overlay slurry is suspended at the pores of the non-woven fabric, which reduces actual contact area between the overlay slurry and the non-woven fabric, and would cause severe problems such as weakened bonding force between the coating and the non-woven fabric, significant performance degradation of the overlay separator of the non-woven fabric or the like.

The non-woven fabric, the lithium battery separator, and the lithium battery separator base membrane according to the embodiments of the present disclosure are described below in detail.

A non-woven fabric, of which the raw material comprises a main fiber and a binder fiber; the binder fiber comprises a first binder fiber and a second binder fiber; the first binder fiber has a melting point or softening point ranging from 120 to 220° C.; the second binder fiber has a melting point or softening point ranging from 100 to 170° C.; and the melting point or softening point of the second binder fiber is lower than the melting point or softening point of the first binder fiber by 15° C. or more; and the melting point or softening point of the main fiber is higher than the melting point or softening point of the first binder fiber by 20° C. or more.

Exemplarily, in an embodiment of the present disclosure, materials for the main fiber include at least one from polyester fiber, polyolefin fiber, polyamide fiber, polyimide fiber, polytetrafluoroethylene fiber, polyphenylene sulfide fiber, polyether ether ketone fiber, polyacrylonitrile fiber, polycarbonate fiber, and aramid fiber.

For example, the polyester fiber may be selected from polyethylene terephthalate, polybutylene terephthalate, polytrimethylene terephthalate, poly(m-phthalic acid) resin and the like. The polyolefin fiber may be selected from polyethylene, polypropylene, polyvinyl chloride, polystyrene, ES (Ethylene-Propylene Side By Side) fibers and the like, and the polyamide fiber may be, e.g., PA66 or the like.

Materials for the first binder fiber include at least one from undrawn polyester fiber, polyvinylidene fluoride fiber, polyamide fiber, copolyamide fiber, and polyolefin fiber.

For example, the undrawn polyester fiber may be selected from polyethylene terephthalate, polybutylene terephthalate and the like. The polyolefin fiber may be selected from polyethylene, polypropylene, polyvinyl chloride, polystyrene, ES fibers and the like.

Materials for the second binder fiber include at least one from polyolefin fiber, copolyester fiber, and copolyamide fiber.

For example, the polyolefin fiber may be selected from polyethylene, polypropylene, polyvinyl chloride, polystyrene, ES fibers and the like. The copolyester fiber may be selected from CoPET, CoPBT (copolybutylene terephthalate) and the like. The copolyamide fiber may be selected from PA6/6, PA6/66, PA6/66/12, PA6/66/69, PA6/66/610, PA6/66/612, PA6/66/1010, PA6/612/12, PA6/610/12, PA6/66/69/12, PA6/66/11/12 and the like.

It shall be clarified that in other embodiments of the present disclosure, other materials may also be selected for use as the first binder fiber, the second binder fiber, and the main fiber.

Exemplarily, the melting point or softening point of the first binder fiber may be 120° C., 125° C., 130° C., 140° C., 145° C., 155° C., 167° C., 183° C., 190° C., 200° C., 210° C., or 220° C. or the like.

The melting point or softening point of the second binder fiber may be 100° C., 105° C., 108° C., 120° C., 126° C., 138° C., 147° C., 156° C., 162° C., or 170° C. or the like.

The melting point or softening point of the main fiber is higher than the melting point or softening point of the first binder fiber by 20° C., 21° C., 23° C., 25° C., 26° C., 28° C., 30° C., 40° C., 50° C., 60° C., 100° C., 150° C., 200° C., 280° C. or the like.

The second binder fiber has a relatively low melting point or softening point, which ranges from 105 to 170° C., and firstly melts during hot-calendering treatment, so as to form a discontinuous fine concave-convex structure on the surface of the non-woven fabric.

The melting point or softening point of the main fiber is higher than that of the first binder fiber and that of the second binder fiber, and can have high dimensional stability during hot-pressing treatment, while the first binder fiber and the second binder fiber melt locally or entirely, wherein the respective fibers are adhered to each other, and a three-dimensional network structure of the non-woven fabric is formed after being cooled. A too low melting point or softening point of the first binder fiber and the second binder fiber would result in excessive melting and severe roller sticking during the hot-pressing treatment; while a too high melting point or softening point of the first binder fiber and the second binder fiber causes non-timely melting during the hot pressing, and accordingly, it is difficult to obtain a desired fine concave-convex structure on the surface of the non-woven fabric.

The concave-convex structure can enable the coating layer and the non-woven fabric to have an anchoring effect realizing a robust joint. The overlay slurry is embedded into the fine concave pores on the surface of the non-woven fabric and is immobile after the curing of the coating, hereby producing extremely strong bonding strength.

The melting point or softening point of the second binder fiber is lower than the melting point or softening point of the first binder fiber by 15° C. or more. In other words, the melting point or softening point of the second binder fiber is set according to the melting point or softening point of the first binder fiber, and the material therefor is selected accordingly. For example, the melting point or softening point of the second binder fiber is lower than the melting point or softening point of the first binder fiber by 15° C., 18° C., 20° C., 25° C., 45° C., 40° C., 28° C., 30° C., 50° C. or 70° C., 90° C. or 115° C. or the like.

The melting point or softening point of the second binder fiber is lower than the melting point or softening point of the first binder fiber by 15° C. or more, which means that during the hot-pressing treatment, the second binder fiber melts at first, and then the first binder fiber melts, wherein the melting degrees at respective temperatures during the formation of the non-woven fabric are controlled so as to form a fine concave-convex structure on the surface.

In some embodiments of the present disclosure, the main fiber accounts for 60-80% of the total mass of the main fiber and the binder fiber; in other words, the main fiber accounts for 60-80% of the total mass of all the fibers, for example, the main fiber accounts for 60%, 62%, 67%, 69%, 72%, 74%, 76%, or 80% etc. of the total mass of all the fibers.

If the content of the main fiber, as structural main body, is relatively low, the mechanical strength of the non-woven fabric would be affected, and the main function of the main fiber is to provide support strength; if the content of the main fiber is relatively high, the main fiber would not be sufficiently adhered to and cured with the binder fiber, wherein the volume density of the non-woven fabric is affected and the mechanical strength also cannot be ensured.

Furthermore, the second binder fiber accounts for 10-40% of the total mass of the binder fiber; as mentioned above, the melting point of the second binder fiber is relatively low, and a relatively low content of the second binder fiber would affect the formation of the fine concave-convex structure of the surface of the non-woven fabric; while a relatively high content of the second binder fiber would cause melting of the polymer on the surface of the non-woven fabric and severe pore blocking, and the desired pore structure cannot be obtained.

Exemplarily, in some embodiments of the present disclosure, both the first binder fiber and the second binder fiber have a fiber length ranging from 1 to 6 mm, and both the first binder fiber and the second binder fiber have a fiber diameter less than or equal to 10 μm. The fiber length of the main fiber ranges from 1 to 6 mm; and the fiber diameter of the main fiber is less than or equal to 4 μm.

Exemplarily, the fiber lengths of the first binder fiber and the second binder fiber may be 1 mm, 2 mm, 3 mm, 4 mm, 5 mm, or 6 mm or the like. The fiber diameters of the first binder fiber and the second binder fiber may be 0.5 μm, 1 μm, 2 μm, 3 μm, 4.5 μm, 6 μm, 6.2 μm, 7.2 μm, 7.6 μm, 8.0 μm, 9.2 μm, or 10 μm or the like.

The fiber length of the main fiber may be 1 mm, 2.5 mm, 3 mm, 3.6 mm, 4.2 mm, 5.1 mm, or 6 mm or the like. The fiber diameter of the main fiber may be 0.2 μm, 0.6 μm, 1.2 μm, 1.8 μm, 2.5 μm, 3 μm, 3.2 μm, 3.6 μm, or 4 μm or the like.

The fiber lengths of the main fiber and the binder fiber range from 1 to 6 mm. If the fiber lengths of the main fiber and the binder fiber are less than 1 mm, there may be a problem of excessively low non-woven fabric strength; and if the fiber lengths of the main fiber and the binder fiber are greater than 6 mm, an excessively long fiber would easily agglomerate and twine, which causes a severe appearance performance deficiency of the non-woven fabric.

When the diameter of the main fiber is less than or equal to 4 μm and the diameter of the binder fiber is less than or equal to 10 μm, the obtained non-woven fabric has an appropriate thickness. If the diameter of the main fiber is greater than 4 μm and the diameter of the binder fiber is greater than 10 μm, the obtained non-woven fabric has a relatively great thickness, and if this non-woven fabric is applied to a lithium battery separator, there would be less active substance that can be filled into the battery, and the capacity of the battery is reduced. In addition, when the diameter of the main fiber is greater than 4 μm and the diameter of the binder fiber is greater than 10 μm, the possibility of generating a large hole in the non-woven fabric is increased, and the overlay slurry would easily permeate from an upper layer to a lower layer through a through hole, hereby increasing the possibility of generating deficiencies such as pinholes in the coating layer.

Moreover, lengths and diameters of the main fiber and the binder fiber within the foregoing ranges can make the pore size of the ultimately obtained non-woven fabric in an appropriate range; the presence of a concave-convex structure on the inner wall of the pore can improve the engagement between the non-woven fabric and the coating, and by controlling the lengths and diameters of the main fiber and the binder fiber and controlling the pore size, it can be avoided that the pore structure is too large and coating pinholes are formed, and the coating permeates to the backside of the non-woven fabric and even causes problems regarding electrochemical safety; and it can be avoided that a too small pore size causes difficulties in permeation of the coating into the pores and in engagement with the concave-convex structure, causing low peel strength.

In some embodiments of the present disclosure, the average pore size of the obtained non-woven fabric is not greater than 4.5 μm, and the ratio of the maximum pore size to the average pore size ranges from 1 to 10. It is conducive for preventing the overlay slurry from permeating from the coating surface to the backside, causing that the overlay slurry is adhered to the surface of a guide roller, which causes extraneous contamination.

Furthermore, the non-woven fabric has a density of 0.50-0.9 g/cm$^3$. It can prevent the overlay slurry from permeating from the coating surface to the backside and reduce the probability of pore blocking of the non-woven fabric, can ensure sufficient porosity without affecting the transmission efficiency of ions, and ensure the electrical performance of the non-woven fabric separator.

Exemplarily, the non-woven fabric according to the present disclosure can be obtained by firstly preparing a fiber base paper from respective raw materials and then performing hot-calendering treatment on the shaped fiber base paper.

The surface of the non-woven fabric provided in the embodiments of the present disclosure has a fine concave-convex structure, such that when coating the surface of the non-woven fabric, the concave-convex structure of the non-woven fabric can improve the adhesiveness of the non-woven fabric, increase the infiltration capability of the overlay slurry on the surface of the non-woven fabric, and enlarge the contact area between the overlay slurry and the non-woven fabric, such that an engaging force is produced by the surfaces of the two inlaid with each other, hereby achieving the effect of a robust joint.

The non-woven fabric provided in the embodiments of the present disclosure can be used for preparing a base membrane of a lithium battery separator, and it shall be clarified that in other embodiments of the present disclosure, the non-woven fabric may also be used for other scenarios and is particularly suitable for uses requiring a robust joint with a coating or a slurry or the like; and the use of the non-woven fabric is not limited in the embodiments of the present disclosure.

The present disclosure further provides a preparation method for a non-woven fabric as described above, wherein the temperature for the hot-pressing treatment is higher than the melting point or softening point of the second binder fiber by 10° C. or more, e.g., by 10-200° C., and the temperature for the hot-pressing treatment is lower than the melting point or softening point of the main fiber.

At the above-mentioned temperature for the hot-pressing treatment, the second binder fiber can melt almost completely, while the first binder fiber melts partially; and during the hot pressing, the second binder fiber is extruded to form a concave-convex structure, and correspondingly, the first binder fiber binds the main fiber.

Furthermore, the hot-pressing speed of the hot-pressing treatment is 1-100 m/min. At this hot-pressing speed, it can be avoided that the second binder fiber blocks holes that are formed.

The present disclosure further provides a lithium battery separator base membrane, with a lithium battery separator base membrane comprising the above non-woven fabric.

The present disclosure further provides a lithium battery separator, comprising a coating and a base membrane as described above, wherein the coating is attached to the surface of the base membrane.

As mentioned above, thanks to the concave-convex structure on the surface thereof, the non-woven fabric provided in the embodiments of the present disclosure can improve the adhesiveness of the non-woven fabric and increase the contact area of the overlay slurry with the non-woven fabric, such that an engaging force is produced by the surfaces of the two inlaid with each other, hereby achieving the effect of a robust joint.

The homogeneity and the excellent adhesiveness of the non-woven fabric enable a bonding between the coating layer and the non-woven fabric, and there is no stratification or delamination between the coating and the non-woven fabric.

The features and the performance of the present disclosure will be further described below in detail with reference to the examples.

Examples 1-6

Examples 1-6 respectively provide a non-woven fabric, and specific fiber compositions are shown in Table 1.

As raw materials of respective examples, fiber base paper having a surface density of 12 g/m² made by an inclined wire paper machine was respectively adopted, and the base paper was then subjected to hot-calendering treatment, wherein the combination of steel roller/soft roller was used for the hot press and hot-pressing temperatures in the respective examples were shown in Table 1, and a non-woven fabric was obtained through hot pressing.

Subsequently, the obtained non-woven fabric was cut into samples having a size of A4, and alumina ceramic particles were applied to one of the external surfaces thereof with an anilox roller, the solid content of an overlay slurry was 35% alumina/10% PVDF by weight, drying through stoving was performed after coating, and a coated sample of non-woven fabric according to the present example was obtained ultimately.

TABLE 1

| | | | Melting point or softening point ° C. | Fiber diameter μm | Fiber length mm | Fiber content wt % | Second binder fiber/binder fiber wt % | Hot-pressing temperature ° C. |
|---|---|---|---|---|---|---|---|---|
| | Fiber | Material | | | | | | |
| Example 1 | main fiber | PET | 245 | 2.25 | 3 | 60 | | 225 |
| | first binder fiber | PET | 120 | 4.12 | 3 | 30 | | |
| | second binder fiber | CoPET | 100 | 4.12 | 3 | 10 | 25% | |
| Example 2 | main fiber | PET | 245 | 2.25 | 5 | 70 | | 130 |
| | first binder fiber | PP | 148 | 2.91 | 5 | 20 | | |
| | second binder fiber | PA6/66/12 | 120 | 4.12 | 5 | 10 | 33% | |
| Example 3 | main fiber | PA66 | 252 | 3.54 | 3 | 80 | | 130 |
| | first binder fiber | PP | 148 | 5.04 | 3 | 12 | | |
| | second binder fiber | PE | 120 | 6.51 | 3 | 8 | 40% | |
| Example 4 | main fiber | PAN | 317 | 2.91 | 2 | 65 | | 225 |
| | first binder fiber | PET | 120 | 9.65 | 5 | 31.5 | | |
| | second binder fiber | PVDF | 112 | 5.82 | 2 | 3.5 | 10% | |
| Example 5 | main fiber | PET | 245 | 1.55 | 5 | 75 | | 105 |
| | first binder fiber | PE | 120 | 2.52 | 3 | 20 | | |
| | second binder fiber | CoPET | 100 | 4.12 | 6 | 5 | 20% | |
| Example 6 | main fiber | PPS | 285 | 2.25 | 3 | 80 | | 225 |
| | first binder fiber | PET | 120 | 5.04 | 5 | 15 | | |
| | second binder fiber | PP | 148 | 6.51 | 5 | 5 | 25% | |

Comparative Examples 1-5

Comparative Examples 1-5 respectively provide a non-woven fabric, and specific fiber compositions are shown in Table 2.

As raw materials of respective comparative examples, fiber base paper having a surface density of 12 g/m² made by an inclined wire paper machine was respectively adopted, and the base paper was then subjected to hot-calendering treatment, wherein the combination of steel roller/soft roller was used for the hot press and hot-pressing temperatures in the respective comparative examples were shown in Table 2, and a non-woven fabric was obtained.

Subsequently, the obtained non-woven fabric was cut into samples having a size of A4, and alumina ceramic particles were applied to one of the external surfaces thereof with an anilox roller, the solid content of an overlay slurry was 35% alumina/10% PVDF by weight, drying through stoving was performed after coating, and a coated sample of non-woven fabric according to the present example was obtained ultimately.

TABLE 2

| | | | Melting point or softening point ° C. | Fiber diameter μm | Fiber length mm | Fiber content wt % | Second binder fiber/binder fiber wt % | Hot-pressing temperature ° C. |
|---|---|---|---|---|---|---|---|---|
| | Fiber | Material | | | | | | |
| Comparative Example 1 | main fiber | PET | 120 | 4 | 4 | 60 | | 105 |
| | first binder fiber | PE | 120 | 6.51 | 4 | 30 | | |
| | second binder fiber | CoPET | 100 | 7.7 | 4 | 10 | 25% | |
| Comparative Example 2 | main fiber | PET | 245 | 2.25 | 3 | 65 | | 225 |
| | first binder fiber | PET | 120 | 4.12 | 5 | 25 | | |
| | second binder fiber | PVDF | 112 | 6.51 | 3 | 10 | 29% | |
| Comparative Example 3 | main fiber | PAN | 317 | 2.25 | 6 | 70 | | 280 |
| | first binder fiber | PPS | 285 | 2 | 3 | 25 | | |
| | second binder fiber | PET | 120 | 4.12 | 6 | 5 | 17% | |
| Comparative Example 4 | main fiber | PBT | 224 | 3.54 | 5 | 60 | | 130 |
| | first binder fiber | PP | 148 | 6.5 | 4 | 30 | | |
| | second binder fiber | PVC | 85 | 10 | 3 | 10 | 25% | |
| Comparative Example 5 | main fiber | PET | 245 | 2.25 | 5 | 65 | | 225 |
| | first binder fiber | PET | 120 | 4.12 | 5 | 35 | | |
| | second binder fiber | | | | | | 0% | |

Fiber Composition in Comparative Examples 1-5

Performance tests were performed on non-woven fabrics obtained in the respective examples and in the respective comparative examples. Test results are shown in Table 3, and test standards are as follow.

The "surface density" of the non-woven fabrics was determined according to GB/T 451.2-2002.

The "thickness" of the non-woven fabrics was determined according to GB/T 451.3-2002; and the "density" of the non-woven fabrics was obtained by dividing the "surface density" of the non-woven fabrics by the "thickness" of the non-woven fabrics.

The "pore size" of the non-woven fabrics was determined according to GB/T 32361-2015.

The "tensile strength" of the non-woven fabrics was determined according to GB/T 12914-2008.

The "peel strength" of the coating layers was determined according to GB/T 2792-2014.

TABLE 3

Performance Test Results of Products in the Respective Examples
and Comparative Examples

| | Non-woven fabric | | | | | | | | Coating |
| | Thickness µm | Surface density g/m$^2$ | Density g/cm$^3$ | Porosity % | Average pore size µm | Maximum pore size/average pore size | Transverse tensile strength N/15 mm | Aspect ratio of tensile strength | layer Peel strength N/m |
|---|---|---|---|---|---|---|---|---|---|
| Example 1 | 14.5 | 11.8 | 0.81 | 41.03 | 3.71 | 4.36 | 15.13 | 1.68 | 110.7 |
| Example 2 | 15.1 | 12.2 | 0.81 | 41.45 | 4.10 | 4.21 | 14.28 | 1.46 | 106.8 |
| Example 3 | 13.8 | 11.5 | 0.83 | 39.61 | 3.63 | 4.47 | 18.70 | 2.18 | 99.0 |
| Example 4 | 16.8 | 12.7 | 0.76 | 45.22 | 3.89 | 4.04 | 17.58 | 2.11 | 108.8 |
| Example 5 | 15.3 | 11.9 | 0.78 | 43.64 | 3.16 | 3.83 | 16.39 | 1.95 | 120.5 |
| Example 6 | 14.9 | 12.4 | 0.83 | 39.69 | 2.96 | 4.13 | 21.01 | 1.38 | 103.9 |
| Comparative Example 1 | 13.0 | 15.5 | 1.19 | 13.60 | 1.79 | 2.91 | 14.02 | 1.52 | 22.3 |
| Comparative Example 2 | 15.3 | 12.0 | 0.78 | 43.17 | 4.41 | 4.58 | 13.78 | 1.48 | 50.6 |
| Comparative Example 3 | 20.5 | 12.5 | 0.61 | 55.81 | 9.80 | 35.8 | 6.51 | 1.19 | 41.5 |
| Comparative Example 4 | 15.1 | 13.3 | 0.88 | 36.17 | 3.04 | 4.62 | 13.91 | 1.22 | 31.5 |
| Comparative Example 5 | 16.0 | 11.8 | 0.74 | 46.56 | 3.40 | 3.74 | 12.20 | 2.30 | 23.6 |

Figure 1:
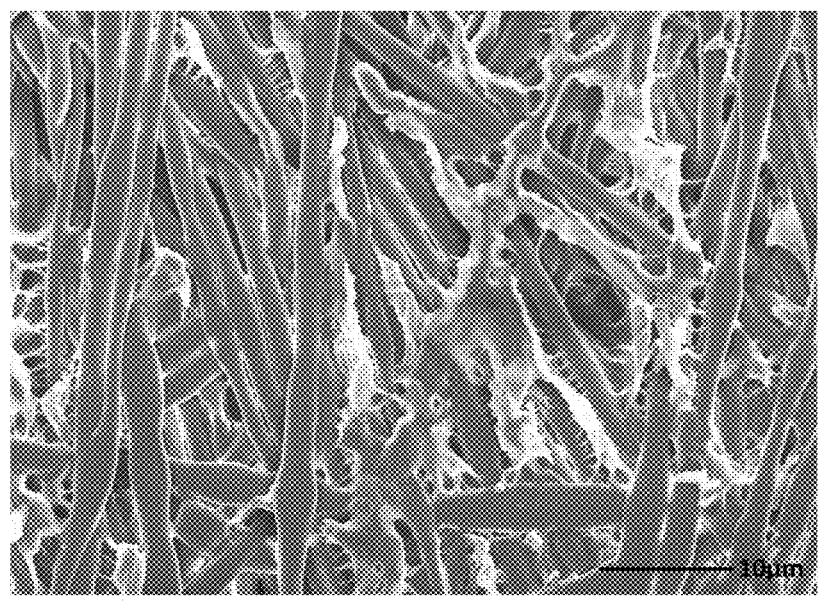
FIG. 1 shows an electron micrograph of the surface of a non-woven fabric according to Example 1.

FIG. 1 shows an electron micrograph of the surface of a non-woven fabric according to Example 1. FIG. 2 shows an electron micrograph of the surface of a non-woven fabric according to Comparative Example 1. FIG. 3 shows an electron micrograph of the surface of a non-woven fabric according to Comparative Example 2. FIG. 4 shows an electron micrograph of the surface of a non-woven fabric according to Comparative Example 3. FIG. 5 shows an electron micrograph of the surface of a non-woven fabric according to Comparative Example 4.

Reference can be made to Table 3 and FIGS. 1-6.

The test results of Comparative Example 1 indicate that when the melting point or softening point of the adopted main fiber was approximately equal to that of the first binder fiber, that is, the difference between the melting point or softening point of the main fiber and the melting point or softening point of the first binder fiber was lower than 20° C., as shown in FIG. 2, excessive polymer melted on the surface of the non-woven fabric, causing severe pore blocking, it was difficult to obtain a desired pore structure, and no fine concave-convex structure could be formed on the surface of the non-woven fabric.

The test results of Comparative Example 2 indicate that when the difference between the melting point or softening point of the adopted first binder fiber and the melting point or softening point of the second binder fiber was lower than 15° C., the first binder fiber and the second binder fiber melted almost synchronously during the hot-pressing process, and as shown in FIG. 3, no fine concave-convex structure could be formed on the surface of the non-woven fabric.

The test results of Comparative Example 3 indicate that when the melting point or softening point of the adopted first binder fiber was higher than 220° C. and its difference with the melting point or softening point of the second binder fiber was greater than 15° C., the first binder fiber could not melt in time during the hot-pressing process, no sufficient adhesion and curing could be realized between respective fibers, the non-woven fabric was loose in structure, and as shown in FIG. 4, no fine concave-convex structure could be formed on the surface of the non-woven fabric.

The test results of Comparative Example 4 indicate that when the melting point or softening point of the adopted second binder fiber was lower than 100° C. and the difference between the melting point or softening point of the first binder fiber and the melting point or softening point of the second binder fiber was greater than 15° C., as shown in FIG. 5, the second binder fiber melted excessively during the hot-pressing process, and severe problems regarding roller sticking occurred, wherein the surface smoothness of the non-woven fabric was affected, and no fine concave-convex structure could be formed on the surface of the non-woven fabric.

FIG. 6 shows an electron micrograph of the surface of a non-woven fabric sample according to Comparative Example 5. As shown in FIG. 6, no concave-convex structure was formed in the pores of the non-woven fabric according to Comparative Example 5, which results in relatively low peel strength.

The non-woven fabrics according to examples 1-6 of the present disclosure had excellent performance, in particular, the peel strength of the coating layer was apparently higher than the peel strength of the samples according to comparative examples 1-5, indicating that the bonding strength of the coating layer against the support layer was significantly enhanced.

The above mentioned is merely preferable embodiments of the present disclosure and is not intended to limit the present disclosure, and for a person skilled in the art, the present disclosure may be modified and changed in various ways. Any modifications, equivalent substitutions, and improvements made within the spirit and the principle of the present disclosure shall all be covered in the scope of protection of the present disclosure.

INDUSTRIAL APPLICABILITY

In summary, the non-woven fabric provided in the embodiments of the present disclosure has relatively good adhesiveness, and can increase the contact area of the overlay slurry with the non-woven fabric, such that an engaging force is produced by the surfaces of the two inlaid with each other, hereby achieving the effect of a robust joint.

The invention claimed is:

1. A lithium battery separator base membrane, wherein the lithium battery separator base membrane comprises a non-woven fabric, wherein a raw material for the non-woven fabric comprises a main fiber and a binder fiber, wherein the binder fiber comprises a first binder fiber and a second binder fiber; and the first binder fiber has a melting point or softening point ranging from 120 to 220° C.; the second binder fiber has a melting point or softening point ranging from 100 to 170° C., and the melting point or softening point of the second binder fiber is lower than the melting point or softening point of the first binder fiber by 15° C. or more;

a melting point or softening point of the main fiber is higher than the melting point or softening point of the first binder fiber by 20° C. or more;

both the first binder fiber and the second binder fiber have a fiber length ranging from 1 to 6 mm, and both the first binder fiber and the second binder fiber have a fiber diameter less than or equal to 10 μm;

a fiber length of the main fiber ranges from 1 to 6 mm; and a fiber diameter of the main fiber is less than or equal to 4 μm;

the main fiber accounts for 60-80% of a total mass of the main fiber and the binder fiber;

the second binder fiber accounts for 10-40% of a total mass of the binder fiber;

a concave-convex structure is formed on the surface of the non-woven fabric; and wherein the non-woven fabric has a density of 0.50-0.9 g/cm³, an average pore size is less than or equal to 4.5 μm, and a ratio of a maximum pore size to the average pore size ranges from 1 to 10.

2. The lithium battery separator base membrane according to claim 1, wherein the melting point or softening point of the second binder fiber is lower than the melting point or softening point of the first binder fiber by 20 to 100° C.

3. The lithium battery separator base membrane according to claim 1, wherein materials for the main fiber comprise at least one from polyester fiber, polyolefin fiber, polyamide fiber, polyimide fiber, polytetrafluoroethylene fiber, polyphenylene sulfide fiber, polyether ether ketone fiber, polyacrylonitrile fiber, polycarbonate fiber, and aramid fiber.

4. The lithium battery separator base membrane according to claim 1, wherein the main fiber accounts for 65-75% of the total mass of the main fiber and the binder fiber.

5. The lithium battery separator base membrane according to claim 1, wherein the second binder fiber accounts for 20-30% of the total mass of the binder fiber.

6. The lithium battery separator base membrane according to claim 3, wherein materials for the first binder fiber comprise at least one from undrawn polyester fiber, polyvinylidene fluoride fiber, polyamide fiber, copolyamide fiber, and polyolefin fiber; and materials for the second binder fiber comprise at least one from polyolefin fiber, copolyester fiber, and copolyamide fiber.

7. The concave-convex structure according to claim 1, wherein a preparation process of the non-woven fabric comprises a hot-pressing treatment, and during the hot-pressing process, the main fiber maintains a dimensional stability while the first binder fiber and the second binder fiber melt to bond the fibers to each other, upon cooling, the concave-convex structure of the non-woven fabric is formed.

*    *    *    *    *